United States Patent
Wieder et al.

(10) Patent No.: US 12,202,452 B2
(45) Date of Patent: Jan. 21, 2025

(54) ELECTRIC PARKING BRAKE

(71) Applicant: Knorr-Bremse Systeme Fuer Nutzfahrzeuge GmbH, Munich (DE)

(72) Inventors: Gerhard Wieder, Besigheim (DE); Friedbert Roether, Cleebronn (DE); Frank Schwab, Kieselbronn (DE); Falk Hecker, Markgroeningen (DE); Michael Herges, Munich (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 105 days.

(21) Appl. No.: 18/049,206

(22) Filed: Oct. 24, 2022

(65) Prior Publication Data

US 2023/0083111 A1      Mar. 16, 2023

Related U.S. Application Data

(62) Division of application No. 16/636,380, filed as application No. PCT/EP2018/071432 on Aug. 7, 2018, now Pat. No. 11,511,718.

(30) Foreign Application Priority Data

Aug. 10, 2017    (DE) .................. 10 2017 118 263.2

(51) Int. Cl.
*B60T 13/68*       (2006.01)
*B60T 13/26*       (2006.01)
(Continued)

(52) U.S. Cl.
CPC ............ *B60T 13/683* (2013.01); *B60T 13/26* (2013.01); *B60T 13/662* (2013.01);
(Continued)

(58) Field of Classification Search
CPC ...... B60T 13/683; B60T 13/26; B60T 13/662; B60T 15/027; B60T 15/041; B60T 15/182; B60T 2201/10
See application file for complete search history.

(56) References Cited

U.S. PATENT DOCUMENTS

2020/0189545 A1     6/2020  Bensch et al.

FOREIGN PATENT DOCUMENTS

| CN | 104192114 A | 12/2014 |
| CN | 105015530 A | 11/2015 |

(Continued)

OTHER PUBLICATIONS

Translation of German Patent No. DE 102007061908 obtained from website: https://worldwide.espacenet.com on Apr. 11, 2022 (from applicant's parent U.S. Appl. No. 16/636,380).*

(Continued)

*Primary Examiner* — Pamela Rodriguez
(74) *Attorney, Agent, or Firm* — NORTON ROSE FULBRIGHT US LLP; Gerard A. Messina

(57) ABSTRACT

An electric-parking-brake for a utility-vehicle, including: a feed-line for brake-pressure air; a discharge-line for brake-pressure air for a pneumatic-brake-device; a first-valve and a second-valve, each being switchable between a stable-state and an activated-state in response to electrical control-signals; and a valve-device which is connected between the feed-line and the discharge-line and exhibits a control-input, the valve device being switchable between a stable-state and an activated-state in response to control signals at the control-input, the feed-line being connected to the discharge-line in the activated-state, in which the first-valve in the stable-state or in the activated-state connects the control-input of the valve-device to the discharge-line, to retain a current-state of the valve-device when the brake-pressure air (Continued)

is applied to the discharge-line, and in the activated or stable state connects the control-input to the second-valve. Also described are an electric parking brake system, a utility vehicle, and a related method.

18 Claims, 7 Drawing Sheets

(51) Int. Cl.
 *B60T 13/66* (2006.01)
 *B60T 15/02* (2006.01)
 *B60T 15/04* (2006.01)
 *B60T 15/18* (2006.01)
(52) U.S. Cl.
 CPC .......... *B60T 15/027* (2013.01); *B60T 15/041* (2013.01); *B60T 15/182* (2013.01); *B60T 2201/10* (2013.01)

(56) References Cited

FOREIGN PATENT DOCUMENTS

| | | |
|---|---|---|
| CN | 105307914 A | 2/2016 |
| CN | 108349477 A | 7/2018 |
| DE | 102005058799 A1 | 6/2007 |
| DE | 102007061908 A1 | 6/2009 |
| DE | 102008027733 A1 | 12/2009 |
| DE | 102015118290 A1 | 4/2017 |
| EP | 2133250 A1 | 12/2009 |
| EP | 2821303 A1 | 1/2015 |
| JP | 2010510126 A | 4/2010 |
| WO | 2008061798 A2 | 5/2008 |

OTHER PUBLICATIONS

International Search Report dated Dec. 17, 2018, of the corresponding International Application PCT/EP2018/071432, filed Aug. 7, 2018.

* cited by examiner

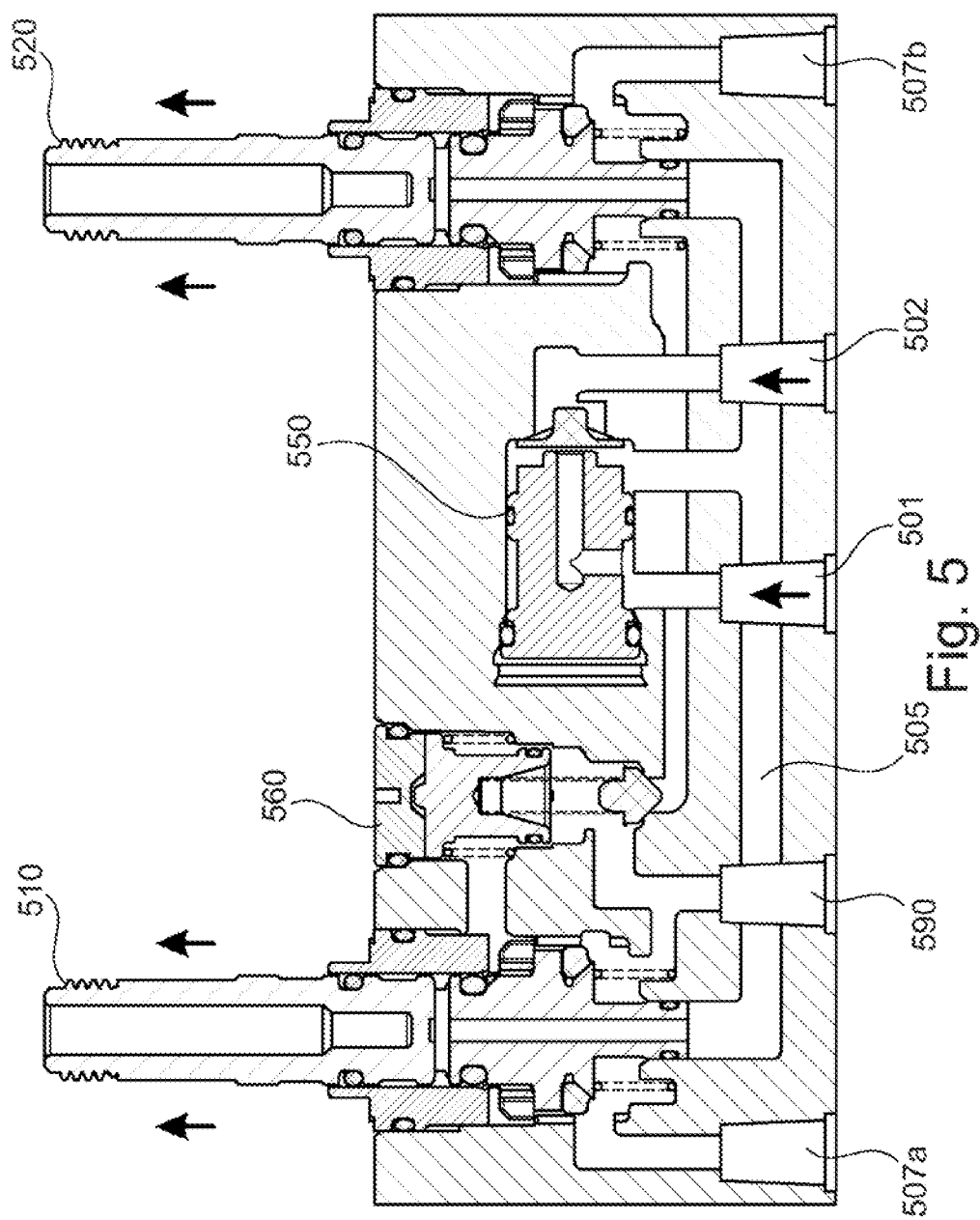
RELATED ART

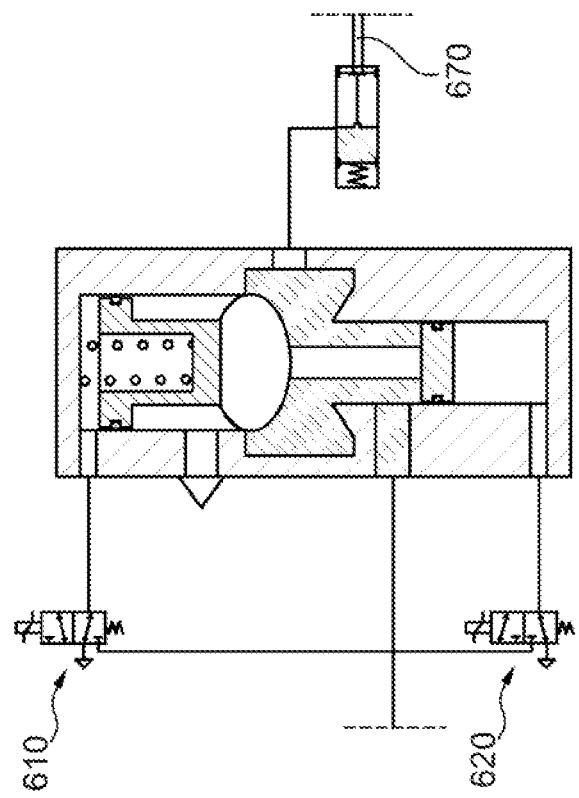
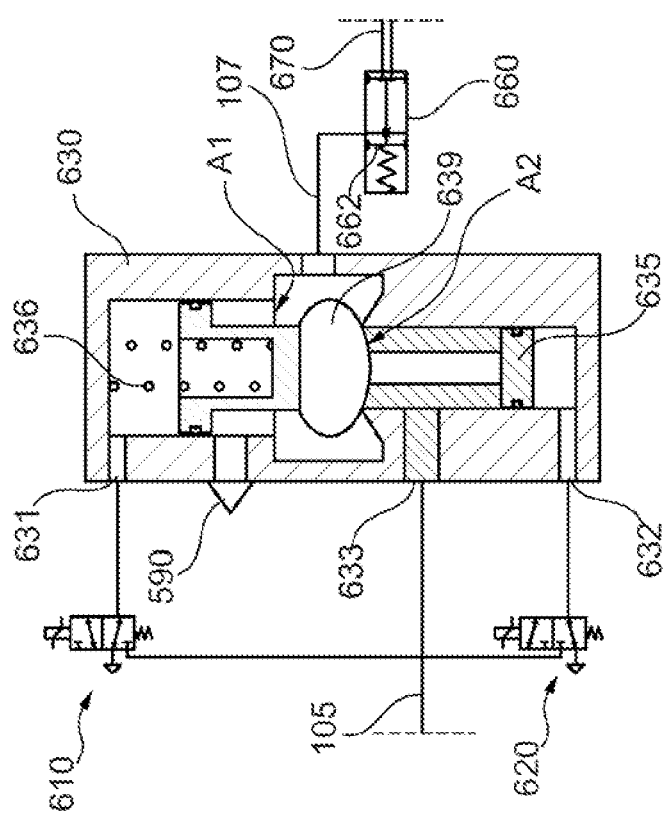
Fig. 6A
Fig. 6B
RELATED ART

ELECTRIC PARKING BRAKE

RELATED APPLICATION INFORMATION

The present application is a divisional application of U.S. patent application Ser. No. 16/636,380 filed Feb. 4, 2020, which issued as U.S. Pat. No. 11,511,718 on Nov. 29, 2022 and which is a U.S. National Phase Application of International Patent Application PCT/EP2018/071432 filed on Aug. 7, 2018, all of which claim priority to and the benefit of German patent application no. 10 2017 118 263.2, which was filed in Germany on Aug. 10, 2017, the disclosures of all of which are incorporated herein by reference.

FIELD OF THE INVENTION

The present invention relates to an electric parking brake for a utility vehicle and to a method for actuating an electric parking brake which has been provided, in particular, for a towing vehicle having an optional trailer.

BACKGROUND INFORMATION

Parking-brake systems have to satisfy various safety requirements. For instance, it is required that they are capable of being operated stably in at least two states. In a first state, moving the vehicle is to be possible without a spontaneous activating of the parking brake being triggered—at least not so long as a sufficient pneumatic pressure is applied. In the second state, a stable parked position is to be maintained, even when the vehicle is not in operation.

Some parking-brake control systems for towing vehicles and trailers are frequently based on an elaborate pneumatic piping system in the cabin of the utility vehicle. Such a system is shown, for instance, in FIG. 5 and includes a first valve 510, a second valve 520, a shuttle valve 550 and a bypass valve 560, which are supplied with compressed air via a first storage-pressure port 501 and a second storage-pressure port 502. The two pneumatic valves 510, 520 are arranged, for example, in the instrument panel of the towing vehicle. In the event of activation, the brake-pressure air is routed to a parking-brake device (for example, a spring-type actuator in the towing vehicle and/or in the trailer), specifically via a vehicle parking-brake port 507b (for the towing vehicle) and/or a trailer parking-brake port 507a (for the trailer). The first storage-pressure port 501 and the second storage-pressure port 502 are connected to a shuttle valve 550 (a so-called double-check valve or select-high valve) which makes a respectively greater pressure from the two storage-pressure ports 501, 502 available to a feed line 505 leading to the first and second valves 510, 520.

The first valve 510 and the second valve 520 are each capable of being operated manually, independently of one another, by a driver. In the retracted state shown, the first valve 510 breaks the fluid connection between the feed line 505 and the trailer parking-brake port 507a. In like manner, the second valve 520 in the state shown breaks the pneumatic connection between the feed line 505 and the vehicle parking-brake port 507b. The position shown of the first valve 510 and of the second valve 520 consequently represents the stable parked position. In this case, the spring-type actuators of the pneumatic brakes have been vented by an existing pneumatic connection to a vent port 590, and the braking action is brought about by springs in the spring-type actuators. In the case of a storage pressure that is too low, the two valves 510, 520 spring out by themselves and vent the spring-type actuators, so that the stable parked position is assumed.

If the towing vehicle are to be moved together with the trailer, the first valve 510 and the second valve 520 are pushed in manually by the driver. Correspondingly, the first valve 510 opens the pneumatic connection between the trailer parking-brake port 507a and the feed line 505, and the second valve 520 opens the pneumatic connection between the feed line 505 and the vehicle parking-brake port 507b.

The bypass valve 560 has the following function. If the driver would like to re-assume the parked position from the stable driving position when both valves 510, 520 are located in the pushed-in state, and only retracts the second valve 520 from the driving position and manually holds the first valve 510 in the lower position, the bypass valve 560 constitutes a pneumatic bypass to the vent port 590, in order nevertheless to obtain the reduction of pressure in the system. As a consequence, in every case a venting of the trailer parking-brake port 507a occurs, so that the trailer also assumes the stable parked state.

However, the parking-brake system shown requires a pneumatic piping systems in the cabin of the vehicle, which is elaborate. There is therefore a need to replace this conventional parking-brake control system with more cost-effective and safe electronic solutions that require less space in the instrument panel of the towing vehicle and nevertheless enable an automatic parking-brake function.

An example of an electronic parking-brake system is shown in FIGS. 6A, 6B, wherein FIG. 6A represents the stable parked position and FIG. 6B represents the stable driving position.

The electric parking brake again includes a first valve 610, a second valve 620 and a valve device 630, which have been formed between a feed line 105 and a discharge line 107. The feed line 105, in turn, provides the brake-pressure air, and the discharge line 107 (outlet) couples to the spring-type actuator 660. In the stable parked position (see FIG. 6A), by virtue of the spring the spring-type actuator 660 brings about a braking force which is exerted via the coupling element 670. In the driving position (see FIG. 6B), the parking brake is released by the brake-pressure air which moves a piston 662 contrary to the spring force.

The first valve 610 and the second valve 620 in this example are electrically controllable solenoid valves which are magnetically controllable between two positions. The valve device 630 includes a first inlet 631, a second inlet 632, a third inlet 633, an outlet 107 and a vent 590. Connected between the first inlet 631 and the feed line 105 is the first valve 610 which either supplies the first inlet 631 with compressed air from the feed line 105 or vents it. Connected between the second inlet 632 and the feed line 105 is the second valve 620 which either supplies the second inlet 632 with compressed air from the feed line 105 or vents it. In the de-energized state, both valves 610, 620 are in the vented position. The third inlet 633 is directly connected to the feed line 105.

The valve device 630 includes a spring 636 which biases a piston 635 in the valve device 630 so that piston 635 closes the third inlet 633 pneumatically via a closing element 639. This is the stable parked position in which, in addition, the first and second valves 610, 620 vent the first and second inlets 631, 632.

The valve device 630 can be brought into the stable driving position via the second inlet 632, by the second valve 620 admitting compressed air into a chamber below piston 635 via the feed line 105. As a consequence, on an underside on piston 635 an additional pneumatic pressure is exerted which suffices to move piston 635 upward contrary to the spring force of the spring 636. Piston 635 can move upward until the closing element 639 closes an upper opening having a cross-sectional area A1. This state is shown in FIG. 6B. This state is similarly stable, since the force with which piston 635 is pushed upward is equal to the product of area A1 and the pressure P made available by the compressed air, and area A1 has been chosen to be larger than area A2 which represents the cross-sectional area at the lower piston stop 635. Therefore piston 635 is held in the upper position with a greater force. In order that this position is still stable even when the second valve 620 is being vented, the spring force F of the spring 636 has been chosen in such a way that:

$$F < (A1-A2)*P$$

where (A1-A2)*P is the force with which piston 635 presses against the spring 636. Therefore the spring tension of the spring 636 cannot push the closing element 639 downward contrary to the compressive force.

If piston 635 is located in the upper position, as shown in FIG. 6B, at the same time the outlet 107 is connected to the third inlet 633, having the consequence that the pneumatic compressed air is also applied to the spring-loaded cylinder 660 and moves piston 662 therein contrary to the spring tension of the spring-type actuator 660. Hence the brake is released and the vehicle can be moved. Since piston 635 remains stably in the upper position, the vehicle can be moved even when the first and second valves 610, 620 are being vented (for example, are being switched off).

Disadvantages of the electronic variant of the parking brake that is shown are its complexity (the valve device 630 needs a total of five ports) and the fact that the stable position depends on the spring force. If the spring force changes through aging processes, this may have the consequence that the valve device 630 can no longer be held stably in the individual positions.

There is therefore a need for alternative solutions that, on the one hand, do not need any pneumatic piping in the cabins of the towing vehicle and, on the other hand, are capable of being realized with simple pneumatic components.

SUMMARY OF THE INVENTION

At least some of the aforementioned problems are solved by an electric parking brake as described herein, by a utility vehicle as described herein, and by a method for operating an electric parking brake as described herein. The further descriptions herein define further advantageous embodiments.

The present invention relates to an electric parking brake for a utility vehicle, said parking brake including the following: a feed line for brake-pressure air, a line for discharge of compressed air for a pneumatic brake device, a first valve and a second valve, which are each capable of being switched between a stable state and an activated state in response to electrical control signals. In addition, the electric parking brake includes a valve device which is connected between the feed line and the discharge line and exhibits a control input. The valve device is designed to switch between a stable state and an activated state in response to control signals at the control input, the feed line being connected to the discharge line in the activated state. In the stable state, the first valve connects the control input of the valve device to the discharge line, in order to retain a current state of the valve device when the brake-pressure air is applied to the discharge line. In the activated state, the first valve connects the control input of the valve device to the second valve. The first valve consequently establishes a feedback which constitutes a stable state so long as sufficient pressure is present (in order to keep the valve device in the activated state).

Within the scope of the present invention, signals may be both electrical signals and pneumatic signals. In addition, connections are generally intended to represent pneumatic connections, so that a component that is connected between two other components or connected thereto is to be understood in such way that the circuit/connection relates, in particular, to a pneumatic flow.

Optionally, the second valve in the stable state connects the feed line to the first valve, in order to activate the valve device (via the first valve), and in the activated state vents the connection to the first valve and to the control terminal of the valve device when the first valve is in the activated state. But the second valve can also connect the feed line to the first valve in the activated state, in order to activate the valve device, and in the stable state can vent the connection to the first valve and to the control terminal of the valve device when the first valve is in the activated state. In both cases it is a question of a "reversal", in the course of the state of the valve device can be altered.

Optionally, the first valve and/or the second valve are 3/2-way solenoid valves which automatically assume the stable state in a de-energized state.

The valve device may be a booster valve with at least one spring-biased piston and with a vent opening. Optionally, the valve device is designed to vent the discharge line in the stable state, in the course of which the vent opening points in a direction of motion of the piston, or may have been arranged to the side thereof. For instance, the valve device may include the following: a housing with at least two chambers, a first opening, a second opening and a third opening. The valve device may, in addition, include the following: a first piston in the first chamber, which has been biased by a first spring element contrary to a pressure at the second opening, and a second piston in the second chamber, which has been biased by a second spring element, in order to interrupt a connection between the first opening and the third opening in an unpressurized state. In the course of a supply of compressed air via the second opening, the first piston contacts the second piston, so that both pistons are displaced together, contrary to the spring tension of the first spring and the spring tension of the second spring, and the connection between the first opening and the third opening is established. In the unpressurized state, the first piston moves away from the second piston, as a result of which the third inlet is connected to the vent opening.

Optionally, the parking brake includes a shuttle valve with a first port for a first supply of compressed air and with a second port for a second supply of compressed air. The shuttle valve is designed to connect the first supply of compressed air or the second supply of compressed air to the feed line, depending on where a higher brake pressure is applied.

The present invention also relates to an electric parking-brake system for a tractor (utility vehicle) with a parking-brake device, in particular a spring-type actuator, and with a trailer parking-brake port. The parking-brake system includes a first and a second electric parking brake as previously described. The first electric parking brake has been formed between the compressed-air supply and a first discharge line which couples to the braking device of the tractor. The second electric parking brake has been formed between the compressed-air supply and a second discharge line which couples to the trailer parking-brake port.

The present invention also relates to a utility vehicle with the parking-brake system and with a braking device that exhibits at least one spring-loaded cylinder which in the unpressurized state activates a parking brake via a spring biasing force and releases the parking brake by virtue of the brake-pressure air at the discharge line.

Optionally, the utility vehicle may exhibit a control device which electrically controls the first valve and/or the second valve, in order:
  upon establishing a desire to drive off, to activate the valve device by activating at least the first valve, and to ensure that the second valve passes compressed air from the feed line;
  upon establishing a desire to park, to bring the valve device into the stable state by activating at least the first valve into the stable state, and to ensure that the second valve vents the connection to the first valve.

The present invention also relates to a method for actuating the electric parking brake. The method comprises:
  upon establishing a desire to drive off, activating the valve device by activating at least the first valve;
  upon establishing a desire to park, switching the valve device into the stable state by venting the control input by activating at least the first valve.

Optionally, the desire to park is triggered by at least one of the following conditions:
  an input by the driver,
  reception of a corresponding signal of a control unit in the case of autonomous vehicle operation,
  establishing a standstill of the vehicle when least one supplementary condition obtains which, in particular, includes switching the ignition off or a continuous actuation of the service brake or another condition.

Optionally, the desire to drive off is triggered by at least one of the following conditions:
  input by the driver,
  actuating an accelerator pedal with the engine running,
  reception of a corresponding signal of a control unit in the case of autonomous vehicle operation,
  actuating the service brake.

Optionally, the electric parking brake is part of the parking-brake system, and the actuating of the first electric parking brake and/or of the second electric parking brake can be undertaken individually or jointly or in succession.

This method, or at least parts thereof, may also have been implemented or stored in the form of instructions in software or on a computer-program product, in which case stored instructions are capable of executing the steps according to the method when the method is running on a processor (for example, in a control unit of the vehicle). Therefore the present invention also relates to a computer-program product with software code (software instructions) stored thereon which is designed to execute one of the previously described methods when the software code is executed by a processing unit. The processing unit may be any form of computer or control unit that exhibits an appropriate microprocessor that can execute a software code.

The exemplary embodiments of the present invention will be better understood from the following detailed description and from the accompanying drawings of the varying exemplary embodiments which, however, should not be understood in such a way that they restrict the disclosure to the specific embodiments, but serve merely for explanation and comprehension.

BRIEF DESCRIPTION OF THE DRAWINGS

FIG. 5 shows a conventional parking-brake control system with the aid of pneumatic valves.

FIGS. 6A and 6B show an electric parking brake.

DETAILED DESCRIPTION

Figure 1:
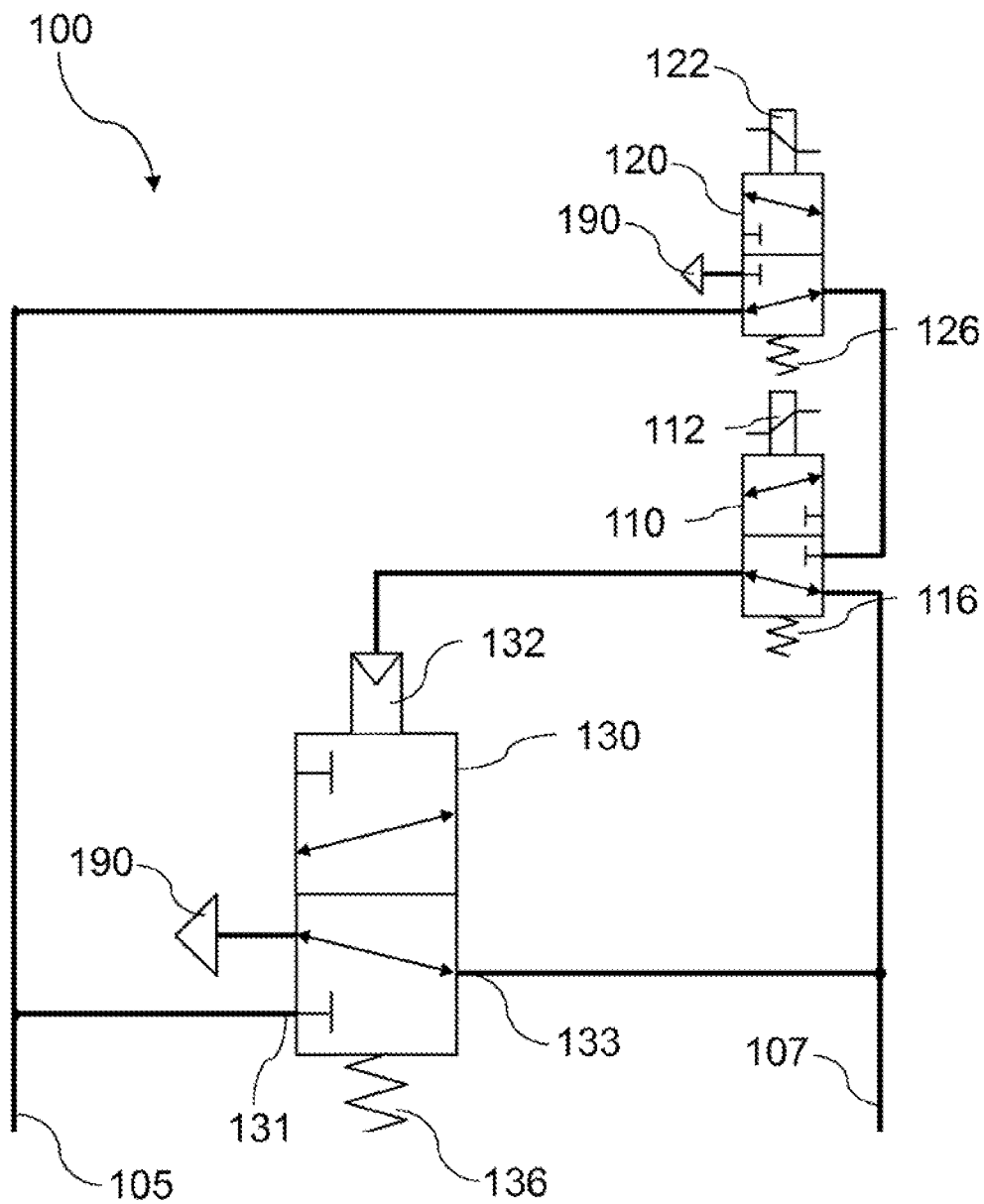
FIG. 1 shows an electric parking brake according to an exemplary embodiment of the present invention.

FIG. 1 shows an exemplary embodiment of an electric parking brake for a utility vehicle. The electric parking brake 100 includes a first valve 110, a second valve 120 and a valve device 130 (for example, a booster valve) which are pneumatically connected between a feed line 105 for brake-pressure air and a discharge line 107 for the brake-pressure air leading to a pneumatic braking device. In this exemplary embodiment, the first valve 110 and the second valve 120 are 3/2-way valves which are capable of being switched between a stable state and an activated state in response to electrical control signals.

The valve device 130 includes a first inlet 131, which is connected to the feed line 105, a second inlet 132 and a third inlet 133 which is connected to the discharge line 107. It will be understood that, depending on the directions of pneumatic flow, the inlets may also be outlets. The second inlet 132 is a control input, in order to switch between a stable state and an activated state in response to (pneumatic) control signals. The control input 132 may also represent an inlet for a pneumatic line, in order to move one or more pistons between two positions or states with the aid of compressed air.

In addition, the valve device 130 shown includes a vent port 190 and a biasing device 136 which, for example, may include a spring. In the stable state, the third inlet 133 is connected to the vent port 190, so that the discharge line 107 is automatically vented (for example, in the event of a drop in pressure) and remains vented so long as no pneumatic control signal is applied to the control input 132. In the activated position, the first inlet 131 is connected to the third inlet 133, and consequently the feed line 105 is connected to the discharge line 107.

The 3/2-way valves 110, 120 also include three pneumatic ports and, additionally, respectively an electrical control terminal 112, 122. The control terminals are designed to switch the first 3/2-way valve 110 and/or the second 3/2-way valve 120 between the stable state and the activated state in response to (electrical) control signals. For instance, the two 3/2-way valves 110, 120 may be solenoid valves, in which case an electromagnet brings about the switching operations.

In the stable state, the first 3/2-way valve 110 connects, for instance, the discharge line 107 to the control input 132 of the valve device 130, in order to retain a current state of the valve device 130 in the case of sufficient brake-pressure air. In the activated state, the first 3/2-way valve 110 connects the control input 132 to the second 3/2-way valve 120.

In the stable state, the second 3/2-way valve 120 connects, for instance, the feed line 105 to the first 3/2-way valve 110, in order to activate the valve device 130 in the case of an activated first 3/2-way valve 110. In the activated state, the second 3/2-way valve 120 interrupts a supply of compressed air to the first valve 110 and vents the connection to the first valve 110. If the first valve 110 has also been activated, the valve device 130 is therefore brought into the stable state and the discharge line 107 is vented.

In further exemplary embodiments (not shown), the states of the second valve 120 (and similarly also of the first valve 110) can be chosen precisely the other way round. Therefore the second valve 120 in the stable state can also vent the connection to the first valve 110, and in the activated state can connect the feed line 105 to the first valve 110.

Figure 2:
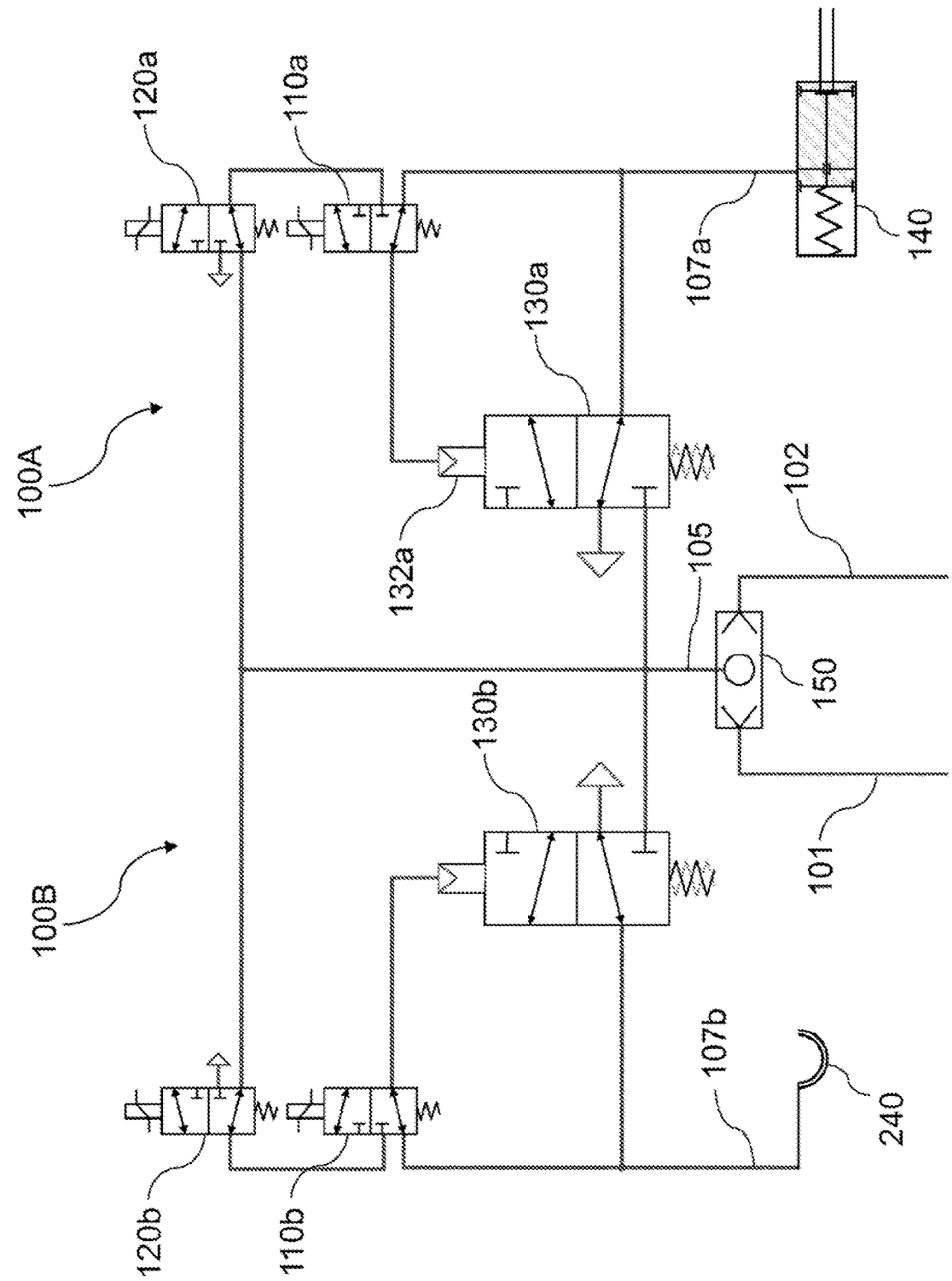
FIG. 2 shows an electric parking-brake system according to further exemplary embodiments.

FIG. 2 shows an electric parking-brake system for a utility vehicle (for example, a towing vehicle) with a trailer parking-brake port 240, a spring-type actuator 140 and a shuttle valve 150 which is connected to a first pressure port 101 and to a second pressure port 102. The shuttle valve 150 is designed to transmit the respectively higher pressure from the first pressure port 101 and the second pressure port 102 to a feed line 105. The trailer parking-brake port 240 and the spring-type actuator 140 are respectively connected to a discharge line 107*a*, 107*b*, in order to be supplied with compressed air (in the driving state) or to be vented (in the parked state).

Correspondingly, two electric parking brakes 100A, 100B have been formed between the feed line 105 and the discharge lines 107*a*, 107*b*. A first electric parking brake 100A actuates the spring-type actuator 140 of the tractor and includes a first valve device 130*a* which is controlled by two 3/2-way valves 110*a*, 120*a*, in order to supply the spring-type actuator 140 with compressed air, or to vent it. A second electric parking brake 100B actuates a trailer parking brake via the trailer parking-brake port 240 and includes a second valve device 130*b* which is likewise controlled by two 3/2-way valves 110*b*, 120*b*, in order to supply the trailer parking-brake port 240 with compressed air or to vent it.

The two electric parking brakes 100A, 100B may have been constructed in the same way and may function in the same way as the electric parking brake from FIG. 1. A renewed description is therefore unnecessary.

Figure 3A:
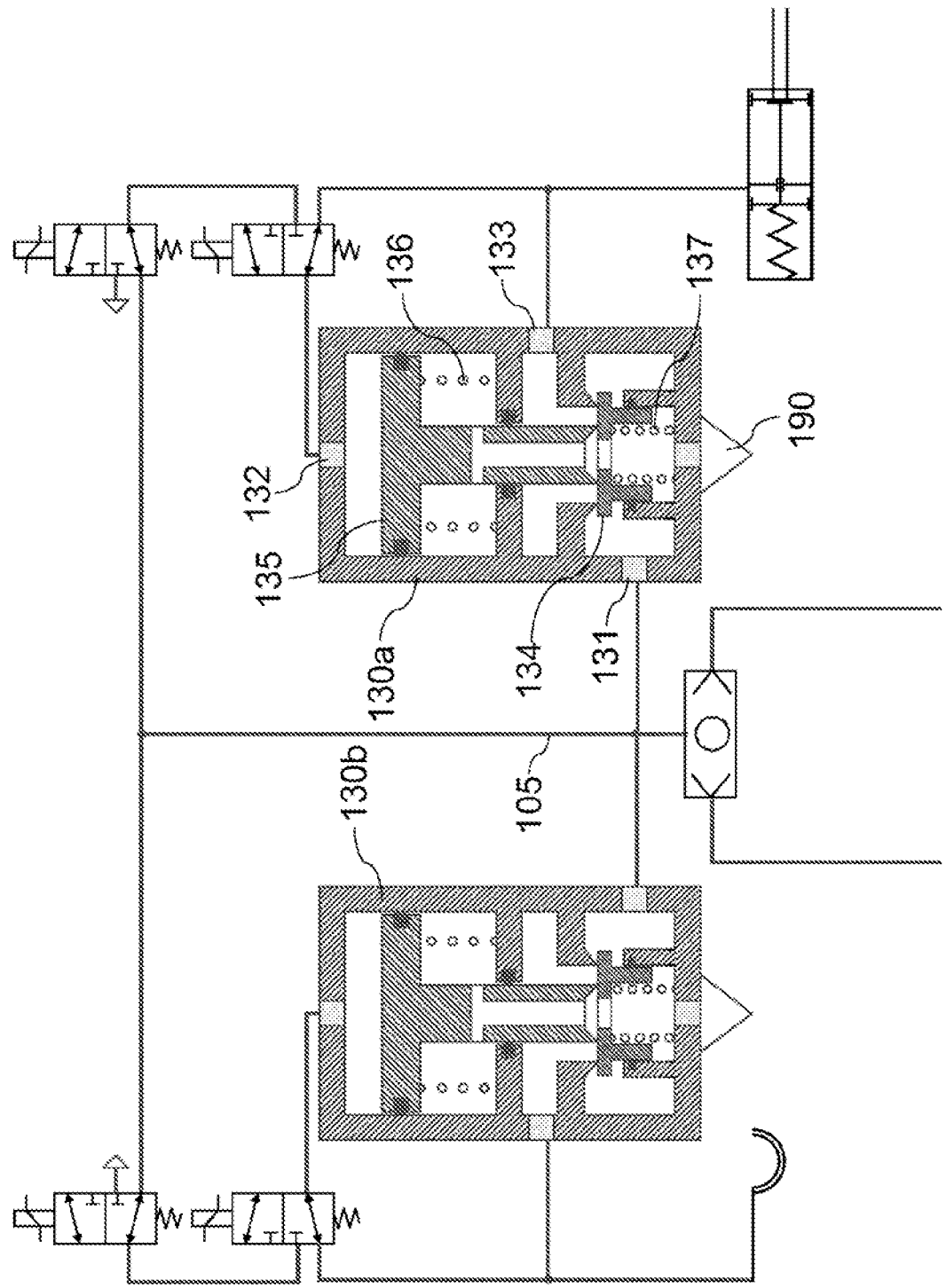
FIGS. 3A and 3B illustrate further details of the electric parking-brake system according to further exemplary embodiments.

FIGS. 3A,B show further exemplary embodiments of the electric parking-brake system 100 from FIG. 2, wherein further details of the first and second valve devices 130*a*, 130*b* are represented. The first and second valve devices 130*a*, 130*b* may have been constructed identically and each include a first inlet 131, a second inlet 132, a third inlet 133 and a vent outlet 190. The valve devices 130*a*, 130*b* each include, in addition, a first piston 135 and a second piston 134, which have been biased correspondingly by a first spring 136 and a second spring 137. The valve devices 130*a*, 130*b* shown have been represented in a sectional representation, wherein the elements shown may have been designed to be rotationally symmetrical, for instance.

According to one embodiment (see FIG. 3A), the vent outlet 190 has been formed below the second piston 134 and therefore constitutes an opening in one of the directions of motion of the pistons. In a further embodiment (see FIG. 3B), the vent outlet 190 has been formed on a side wall (laterally alongside pistons 134, 135), in order to open a chamber below the first piston 135 toward the outside.

When the second inlet 132 has been vented, the first piston 135 moves away from the second piston 134, and the vent opening 190 is connected to the third inlet 133. For this purpose, channels have been formed in pistons 134, 135, so that the compressed air is discharged from the third inlet 133 either to the vent opening 190 on the underside (see FIG. 3A) or to the vent opening 190 on the side wall (see FIG. 3B).

If compressed air is applied to the second inlet 132, the first piston 135 is pressed down against the spring tension until the first piston 135 comes into contact with the second piston 134 and then presses the latter down contrary to the spring tension of the second spring 137. Since in this state the first piston 135 and the second piston 134 are connected to one another, the vent opening 190 is closed and no longer in contact with the third inlet 133. Instead of this, the first inlet 131 is connected to the third inlet 133, since the second piston 134 opens the first inlet 131 in the course of being pressed down.

Figure 4:
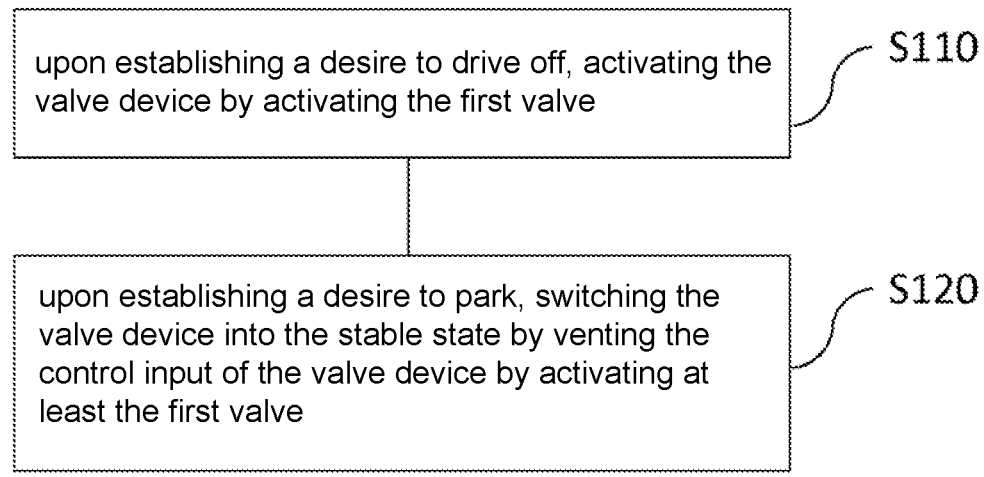
FIG. 4 shows a flowchart for a method for controlling an electric parking brake according to an exemplary embodiment.

FIG. 4 shows a flowchart for a method for actuating the described electric parking brake. The method comprises:

upon establishing a desire to drive off, activating S110 the valve device 130 by activating at least the first valve 110;

upon establishing a desire to park, switching S120 the valve device 130 into the stable state by venting the control input 132 of the valve device 130 by activating at least the first valve.

It will be understood that all the described functions of the electric parking brake 100 or of the parking-brake system can be executed as further optional steps.

This method may also be computer-implemented—that is to say, it may have been realized by instructions that have been stored on a storage medium and are capable of executing the steps of the method when it is running on a processor. The instructions typically comprise one or more instructions that may have been stored in varying ways on varying media in, or peripheral to, a control unit (with a processor) and that, when they are read and are executed by the control unit, cause the control unit to carry out functions, functionalities and operations that are necessary for executing a method according to the present invention.

The software may, for instance, have been designed to switch on the parking brake of the towing vehicle and of the trailer individually or jointly, and opens it in accordance with the desire of the driver. In addition, the software can automatically engage the parking brake of the towing vehicle and/or trailer at a standstill under certain supplementary conditions. Similarly, under certain conditions the software can automatically open the parking brake of the towing vehicle and/or trailer if, for instance, a desire of the driver to move off was detected.

Advantageous aspects of the electric parking-brake system may also be summarized as follows:

The first and second valve devices 130*a*, 130*b* are each, for instance, a double-seat booster valve for the parking brake of the towing vehicle or for the parking brake of the trailer, in which case each booster valve 130*a*, 130*b* can be controlled with a first 3/2-way solenoid valve 110*a*, 110*b*. This first 3/2-way valve 110*a*, 110*b* is capable of being switched between two switch positions: a "feedback" (in the stable state) and a "reversal" (in the activated state). In the case of the "feedback", the outlet 133 of the booster valve 130*a*, 130*b* is connected to the control input 132*a*, 132*b* thereof, in order to sustain the switching state thereof stably. In the case of the "reversal" switching position, the control input 132*a*, 132*b* of the booster valve 130*a*, 130*b* is connected to a second 3/2-way solenoid valve 120*a*, 120*b*.

The second 3/2-way solenoid valve 120*a*, 120*b* can now, in a first switching position, connect the control input 132*a*, 132*b* of the respective booster valve 130*a*, 130*b* to the atmosphere (venting), in order to switch the booster valve 130a, 130b into the venting position, or, in a second switching position, connect to a storage pressure (from the feed line 105), in order to switch the booster 130a, 130b into the venting position.

The first 3/2-way solenoid valve 110a, 110b is in the de-energized state (stable state) in the "feedback" switching position. After the reversal of the booster valve 130a, 130b, the first 3/2-way solenoid valve 110a, 110b is firstly switched off again, so that it therefore automatically goes into the "feedback" switching position. After this, the switch position of the second 3/2-way solenoid valve 120a, 120b no longer has any influence.

Both booster valves 130a, 130b and the 3/2-way solenoid valves 110a, 110b thereof can, for instance, be supplied pneumatically from the two storage circuits 101, 102 by a shuttle valve 150, as in conventional parking-brake systems.

The respective booster piston 135a, 135b is pushed in the "venting" direction by a spring 136a, 136b. As a result, the booster valve 130a, 130b can only be in the aerating position if it holds that:

Storage pressure×Area of booster piston>Spring force.

If the storage pressure of both brake circuits 101, 102 falls below this pressure, the corresponding booster 130a, 130b will automatically go into the venting position after overcoming the friction (on piston 135). Hence it is ensured that a vehicle that no longer has sufficient brake pressure for the service brake automatically comes to a halt with the parking brake.

Figure 3B:
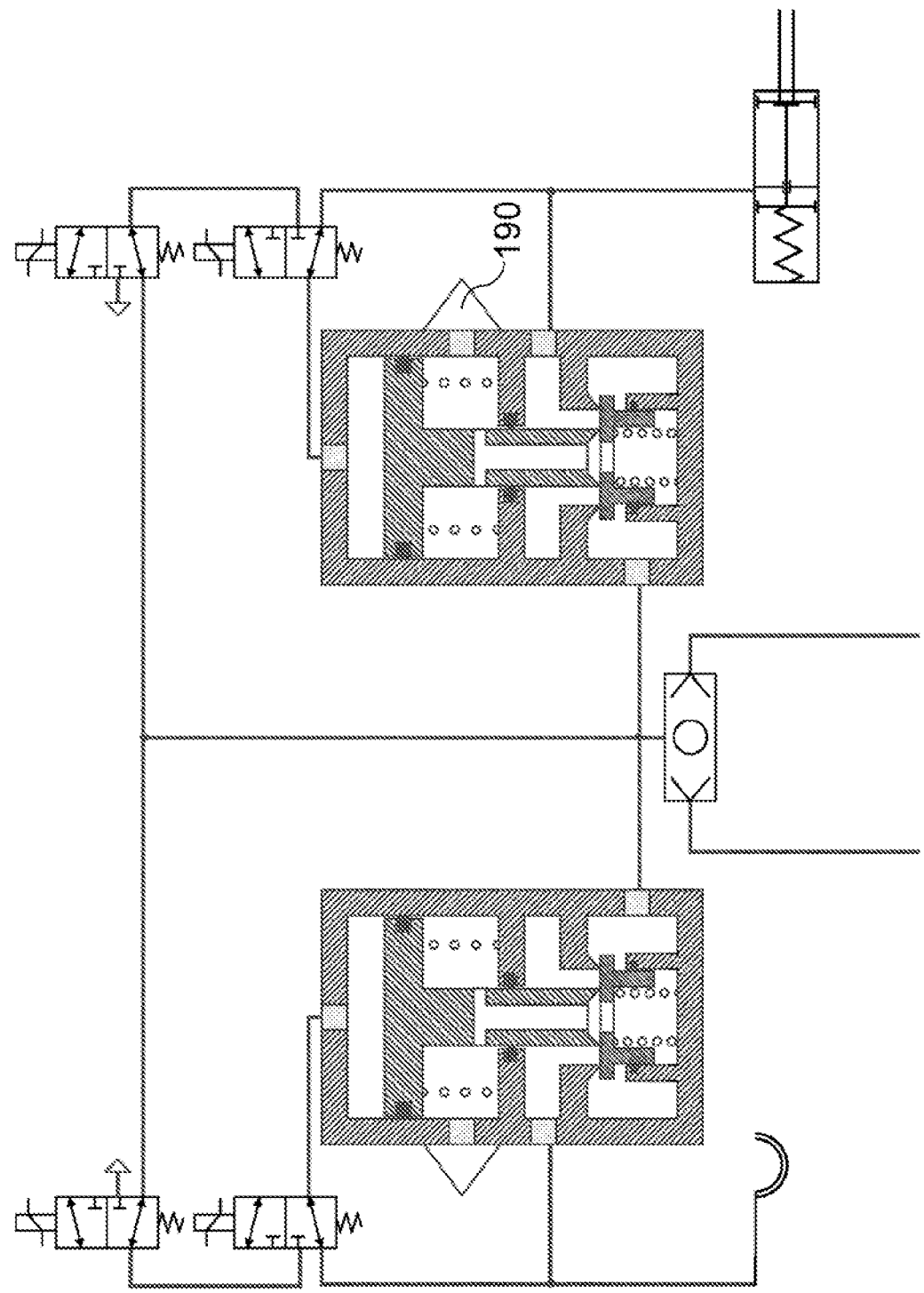

The booster valve 130a, 130b may, in addition, be present in two variants: with a central vent (see FIG. 3A) or with a side vent (see FIG. 3B). The second 3/2-way solenoid valve 120 can be switched in currentless manner to aerating. Alternatively, it is likewise possible that the second 3/2-way solenoid valve 120 is switched in currentless manner to venting.

With this parking-brake system and with a corresponding electronic control system in an electronic control unit (ECO) (for controlling the 3/2-way solenoid valves 110, 120) and also with two electrical push-buttons as human/machine interface (HMI), all the functions such as are known from conventional parking-brake systems, and also diverse additional automatic functions, can be carried out in software-controlled manner.

The features of the invention disclosed in the description, in the claims and in the figures may be essential, both individually and in arbitrary combination, for the realization of the invention.

LIST OF REFERENCE SYMBOLS 100A, 100B electric parking-brake units
101, 102, 501, 502 compressed-air supply
105 feed line
107 discharge line
110, 120, 610, 620 first and second 3/2-way valves
111, 113, 114 ports of the first 3/2-way valve
121, 123, 124 ports of the second 3/2-way valve
112, 122 electrical control terminals
116, 136 biasing device
130, 630 valve device
131, 133, 631, 632, . . . inlets
132 control input
134, 135 piston of the valve device
137, 636 spring
140, 660 spring-type actuator
150, 550 shuttle valve
190, 590 vent
240 brake port for trailer
505 feed line
507a,b parking-brake ports
510, 520 manual valves
560 bypass unit
639 piston element
662 spring-loaded piston
670 brake component
A1, A2 effective pressure areas

The invention claimed is:

1. An electric parking brake for a utility vehicle, comprising:
a feed line for brake-pressure air;
a discharge line for brake-pressure air for a pneumatic brake device;
a first valve and a second valve which are each switchable between a stable state and an activated state in response to electrical control signals; and
a valve device, which is connected between the feed line and the discharge line and exhibits a control input, the valve device being switchable between a stable state and an activated state in response to control signals at the control input, the feed line being connected to the discharge line in the activated state;
wherein the first valve in the stable state or in the activated state connects the control input of the valve device to the discharge line, to retain a current state of the valve device when the brake-pressure air is applied to the discharge line, and in the activated state or in the stable state connects the control input to the second valve,
wherein the valve device includes a booster valve with at least one spring-biased piston and with a vent opening, and wherein the valve device is configured to vent the discharge line in the stable state, and the vent opening points in a direction of motion of the piston or is arranged to the side thereof, and
wherein the valve device includes a first inlet, which is connected to the feed line, a second inlet and a third inlet which is connected to the discharge line, wherein the second inlet is the control input for switching between the stable state and the activated state in response to the control signals.

2. The parking brake of claim 1, wherein the second valve in the stable state connects the feed line to the first valve, to activate the valve device, and in the activated state vents a connection to the first valve and, when the first valve is in the activated state, vents a connection to a control terminal of the valve device.

3. The parking brake of claim 1, wherein the second valve in the activated state connects the feed line to the first valve, to activate the valve device, and in the stable state vents a connection to the first valve and, when the first valve is in the activated state, vents a connection to a control terminal of the valve device.

4. The parking brake of claim 1, wherein the first valve and the second valve are 3/2-way solenoid valves which assume the stable state in a de-energized state.

5. The parking brake of claim 1, wherein the control input represents an inlet for a pneumatic line to move one or more pistons between two positions or states with compressed air, wherein the first valve, the second valve and the valve device are pneumatically connected between the feed line for brake-pressure air and the discharge line for the brake-pressure air leading to a pneumatic braking device, and wherein the first valve establishes a feedback which constitutes a stable state so long as sufficient pressure is present to keep the valve device in the activated state.

6. The parking brake of claim 1, wherein the valve device includes the following:
a housing with at least two chambers;
a first opening, a second opening and a third opening;
a first piston in the first chamber, which is biased by a first spring element contrary to a pressure at the second opening; and
a second piston in the second chamber, which is biased by a second spring element, to interrupt a connection between the first opening and the third opening in an unpressurized state, and
wherein in the course of a supply of compressed air via the second opening the first piston contacts the second piston and both pistons are displaced contrary to the spring tension of the first spring and the spring tension of the second spring, so that the connection between the first opening and the third opening is open, whereas in the unpressurized state the first piston moves away from the second piston and as a result connects the third inlet to the vent opening.

7. The parking brake of claim 1, further comprising:
a shuttle valve with a first port for a first compressed-air supply and with a second port for a second compressed-air supply, the shuttle valve being connectable to the first compressed-air supply or the second compressed-air supply to the feed line, depending on where a higher brake pressure is applied.

8. An electric parking-brake system for a utility vehicle with a parking-brake device, which includes a spring-type actuator, and with a trailer parking-brake port, comprising:
a first electric parking brake, wherein the first electric parking brake has been formed between a compressed-air supply and a first discharge line which couples to the parking-brake device; and
a second electric parking brake, wherein the second electric parking brake has been formed between the compressed-air supply and a second discharge line which couples to the trailer parking-brake port;
wherein each of the electric parking brakes includes:
a feed line for brake-pressure air;
a discharge line for brake-pressure air for a pneumatic brake device;
a first valve and a second valve which are each switchable between a stable state and an activated state in response to electrical control signals; and
a valve device, which is connected between each feed line and each discharge line and exhibits a control input, each valve device being switchable control input, the feed line being connected to each discharge line in the activated state;
wherein each first valve in the stable state or in the activated state connects the control input of each valve device to each discharge line, to retain a current state of each valve device when the brake-pressure air is applied to the discharge line, and in the activated state or in the stable state connects the control input to each second valve,
wherein each valve device includes a booster valve with at least one spring-biased piston and with a vent opening, and wherein each valve device is configured to vent each discharge line in the stable state, and each vent opening points in a direction of motion of each piston or is arranged to the side thereof, and
wherein each valve device includes a first inlet, which is connected to each feed line, a second inlet and a third inlet which is connected to each discharge line, wherein each second inlet is the control input for switching between each stable state and each activated state, in response to the control signals.

9. The electric parking-brake system of claim 8, wherein the control input represents an inlet for a pneumatic line to move one or more pistons between two positions or states with compressed air, wherein each first valve, each second valve and each valve device are pneumatically connected between each feed line for brake-pressure air and each discharge line for the brake-pressure air leading to a pneumatic braking device, and wherein each first valve establishes a feedback which constitutes a stable state so long as sufficient pressure is present to keep each valve device in the activated state.

10. A utility vehicle with a braking device which exhibits at least one spring-loaded cylinder which in the unpressurized state activates a parking brake via a biasing force, comprising:
an electric parking-brake system, the parking brake being releasable by brake pressure-air and a discharge line;
wherein the electric parking-brake system includes:
a first electric parking brake, wherein the first electric parking brake has been formed between a compressed-air supply and a first discharge line which couples to the parking-brake device; and
a second electric parking brake, wherein the second electric parking brake has been formed between the compressed-air supply and a second discharge line which couples to a trailer parking-brake port;
wherein each of the electric parking brakes includes:
a feed line for brake-pressure air;
a discharge line for brake-pressure air for a pneumatic brake device;
a first valve and a second valve which are each switchable between a stable state and an activated state in response to electrical control signals; and
a valve device, which is connected between each feed line and each discharge line and exhibits a control input, each valve device being switchable between a stable state and an activated state in response to control signals at the control input, each feed line being connected to each discharge line in the activated state;
wherein each first valve in the stable state or in the activated state connects the control input of each valve device to each discharge line, to retain a current state of each valve device when the brake-pressure air is applied to each discharge line, and in the activated state or in the stable state connects the control input to each second valve,
wherein each valve device includes a booster valve with at least one spring-biased piston and with a vent opening, and wherein each valve device is configured to vent each discharge line in the stable state, and each vent opening points in a direction of motion of each piston or is arranged to the side thereof, and
wherein each valve device includes a first inlet, which is connected to each feed line, a second inlet and a third inlet which is connected to each discharge line, wherein each second inlet is the control input for switching between each stable state and each activated state in response to the control signals.

11. The utility vehicle of claim 10, further comprising:
a control device for electrically controlling each first valve and/or each second valve, which is configured to perform as follows:

activating, upon establishing a desire to drive off, each valve device by activating at least each first valve, and ensuring that each second valve passes compressed air from each feed line; and bringing, upon establishing a desire to park, each valve device into the stable state by activating at least each first valve into the stable state, and ensuring that each second valve vents the connection to each first valve.

12. The utility vehicle of claim 10, wherein the control input represents an inlet for a pneumatic line to move one or more pistons between two positions or states with compressed air, wherein each first valve, each second valve and each valve device are pneumatically connected between each feed line for brake-pressure air and each discharge line for the brake-pressure air leading to a pneumatic braking device, and wherein each first valve establishes a feedback which constitutes a stable state so long as sufficient pressure is present to keep each valve device in the activated state.

13. A method for actuating an electric parking brake, the method comprising:

activating, upon establishing a desire to drive off, a valve device by activating a first valve; and switching, upon establishing a desire to park, the valve device into a stable state by venting a control input by activating at least the first valve;

wherein the electric parking brake includes:
a feed line for brake-pressure air;
a discharge line for brake-pressure air for a pneumatic brake device;
the first valve and a second valve which are each switchable between a stable state and an activated state in response to electrical control signals; and
the valve device, which is connected between the feed line and the discharge line and exhibits the control input, the valve device being switchable between the stable state and an activated state in response to control signals at the control input, the feed line being connected to the discharge line in the activated state; and
wherein the first valve in the stable state or in the activated state connects the control input of the valve device to the discharge line, to retain a current state of the valve device when the brake-pressure air is applied to the discharge line, and in the activated state or in the stable state connects the control input to the second valve,
wherein the valve device includes a booster valve with at least one spring-biased piston and with a vent opening, and wherein the valve device is configured to vent the discharge line in the stable state, and the vent opening points in a direction of motion of the piston or is arranged to the side thereof, and
wherein the valve device includes a first inlet, which is connected to the feed line, a second inlet and a third inlet which is connected to the discharge line, wherein the second inlet is the control input for switching between the stable state and the activated state in response to the control signals.

14. The method of claim 13, wherein the desire to park is triggered by at least one of the following conditions: (i) an input by the driver, (ii) reception of a corresponding signal of a control unit in the case of autonomous vehicle operation, (iii) establishing a standstill of the vehicle when at least one supplementary condition obtains which includes switching the ignition off or a continuous actuation of the service brake or another condition; and wherein the desire to drive off is triggered by at least one of the following conditions: (a) input by the driver, (b) actuating an accelerator pedal, (c) reception of a corresponding signal of a control unit in the case of autonomous vehicle operation, and (d) actuating the service brake.

15. The method of claim 13, wherein the electric parking brake is part of a parking-brake system, further comprising:

actuating a first electric parking brake and/or a second electric parking brake, the actuating being executed individually or jointly or in succession;

wherein the electric parking-brake system includes:
the first electric parking brake, wherein the first electric parking brake has been formed between the compressed-air supply and a first discharge line which couples to the parking-brake device; and
the second electric parking brake, wherein the second electric parking brake has been formed between the compressed-air supply and a second discharge line which couples to a trailer parking-brake port;
wherein each of the electric parking brakes includes:
a feed line for brake-pressure air;
a discharge line for brake-pressure air for a pneumatic brake device;
a first valve and a second valve which are each switchable between a stable state and an activated state in response to electrical control signals; and
a valve device, which is connected between each feed line and each discharge line and exhibits a control input, each valve device being switchable between a stable state and an activated state in response to control signals at the control input, each feed line being connected to each discharge line in the activated state;
wherein each first valve in the stable state or in the activated state connects the control input of each valve device to each discharge line, to retain a current state of each valve device when the brake-pressure air is applied to each discharge line, and in the activated state or in the stable state connects the control input to each second valve, and
wherein each valve device includes a booster valve with at least one spring-biased piston and with a vent opening, and wherein each valve device is configured to vent each discharge line in the stable state, and each vent opening points in a direction of motion of each piston or is arranged to the side thereof.

16. The method of claim 13, wherein the control input represents an inlet for a pneumatic line to move one or more pistons between two positions or states with compressed air, wherein the first valve, the second valve and the valve device are pneumatically connected between the feed line for brake-pressure air and the discharge line for the brake-pressure air leading to a pneumatic braking device, and wherein the first valve establishes a feedback which constitutes a stable state so long as sufficient pressure is present to keep the valve device in the activated state.

17. A non-transitory computer readable medium having a computer-program, which is executable by a processor, comprising:

a program code arrangement having program code for actuating an electric parking brake, by performing the following:

activating, upon establishing a desire to drive off, a valve device by activating a first valve; and switching, upon establishing a desire to park, the valve device into a stable state by venting a control input by activating at least the first valve;

wherein the electric parking brake includes:

a feed line for brake-pressure air;

a discharge line for brake-pressure air for a pneumatic brake device;

the first valve and a second valve which are each switchable between a stable state and an activated state in response to electrical control signals; and the valve device, which is connected between the feed line and the discharge line and exhibits the control input, the valve device being switchable between the stable state and an activated state in response to control signals at the control input, the feed line being connected to the discharge line in the activated state; and wherein the first valve in the stable state or in the activated state connects the control input of the valve device to the discharge line, to retain a current state of the valve device when the brake-pressure air is applied to the discharge line, and in the activated state or in the stable state connects the control input to the second valve, wherein the valve device includes a booster valve with at least one spring-biased piston and with a vent opening, and wherein the valve device is configured to vent the discharge line in the stable state, and the vent opening points in a direction of motion of the piston or is arranged to the side thereof, and wherein the valve device includes a first inlet, which is connected to the feed line, a second inlet and a third inlet which is connected to the discharge line, wherein the second inlet is the control input for switching between the stable state and the activated state in response to the control signals.

18. The computer readable medium of claim 17, wherein the control input represents an inlet for a pneumatic line to move one or more pistons between two positions or states with compressed air, wherein the first valve, the second valve and the valve device are pneumatically connected between the feed line for brake-pressure air and the discharge line for the brake-pressure air leading to a pneumatic braking device, and wherein the first valve establishes a feedback which constitutes a stable state so long as sufficient pressure is present to keep the valve device in the activated state.

* * * * *